US012686323B2

(12) United States Patent
Monnier et al.

(10) Patent No.: US 12,686,323 B2
(45) Date of Patent: Jul. 21, 2026

(54) LIGHTING AND SIGNALLING DEVICE FOR A MOTOR VEHICLE

(71) Applicant: VALEO VISION, Bobigny (FR)

(72) Inventors: Remi Monnier, Bobigny (FR); Sebastien Roels, Bobigny (FR); Pierre Albou, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/875,868

(22) PCT Filed: Jun. 28, 2023

(86) PCT No.: PCT/EP2023/067656
§ 371 (c)(1),
(2) Date: Dec. 17, 2024

(87) PCT Pub. No.: WO2024/003140
PCT Pub. Date: Jan. 4, 2024

(65) Prior Publication Data
US 2026/0021760 A1 Jan. 22, 2026

(30) Foreign Application Priority Data
Jun. 30, 2022 (FR) ..................................... 2206699

(51) Int. Cl.
*B60Q 1/00* (2006.01)
*F21S 41/20* (2018.01)
(Continued)

(52) U.S. Cl.
CPC ........ *B60Q 1/0058* (2013.01); *F21S 41/2805* (2024.05); *F21S 41/645* (2018.01);
(Continued)

(58) Field of Classification Search
CPC .... F21S 41/645; F21S 43/2651; F21S 43/601; F21S 41/249; F21S 41/245; B60Q 1/0058
See application file for complete search history.

(56) References Cited

U.S. PATENT DOCUMENTS 7,252,418 B2 * 8/2007 Enders .................... B60Q 3/74
362/465
11,230,225 B1 * 1/2022 Stefanov-Wagner ........................
F21S 41/683
(Continued)

FOREIGN PATENT DOCUMENTS

AT 519123 B1 4/2018
DE 102013223717 A1 5/2015
(Continued)

OTHER PUBLICATIONS

European Patent Office / International search report and written opinion for the international patent application PCT/EP2023/067656 dated Oct. 5, 2023.

*Primary Examiner* — Matthew J. Peerce
(74) *Attorney, Agent, or Firm* — Valeo Vision

(57) ABSTRACT

The present invention relates mainly to a lighting and signalling device including at least one luminous module capable of generating a lighting beam along a longitudinal optical axis and an optical element through which the lighting beam is projected. The lighting and signalling device includes a controllable liquid-crystal screen pressed against the optical element, the controllable liquid-crystal screen being capable of adopting different diffusion states, including at least one state of projection of the lighting beam in which the controllable liquid-crystal screen is transparent and a state of emission of a signalling beam in which the controllable liquid-crystal screen is at least partially diffusing.

8 Claims, 5 Drawing Sheets

(51) Int. Cl.

| | | |
|---|---|---|
| *F21S 41/64* | (2018.01) | |
| *F21S 43/00* | (2018.01) | |
| *F21S 43/20* | (2018.01) | |
| *F21S 43/245* | (2018.01) | |
| *F21S 43/249* | (2018.01) | |

(52) U.S. Cl.
CPC ........... *F21S 43/245* (2018.01); *F21S 43/249* (2018.01); *F21S 43/2651* (2024.05); *F21S 43/601* (2024.05)

(56) References Cited

U.S. PATENT DOCUMENTS

| | | | | |
|---|---|---|---|---|
| 11,946,612 B2 * | 4/2024 | Hallitschke | ............ | B60Q 1/544 |
| 2015/0354772 A1 | 12/2015 | Chen | | |
| 2016/0077402 A1 * | 3/2016 | Takehara | .............. | F21S 41/645 |
| | | | | 349/33 |
| 2019/0170317 A1 * | 6/2019 | Gloss | ................... | F21S 43/251 |

FOREIGN PATENT DOCUMENTS

| | | | |
|---|---|---|---|
| EP | 1523431 B1 | 8/2006 | |
| EP | 3597991 A1 | 1/2020 | |
| FR | 2590965 A1 | 6/1987 | |

* cited by examiner

LIGHTING AND SIGNALLING DEVICE FOR A MOTOR VEHICLE

TECHNICAL FIELD

The invention relates to the field of lighting and/or luminous signalling in the automotive field.

BACKGROUND OF THE INVENTION

The field of lighting and/or luminous signalling in automotive vehicles is subject to regulations which dictate that each automotive vehicle must be equipped with lights, performing specific safety functions, and notably with signalling lights, and high beam and low beam lights. Signalling lights are generally used to communicate information to other road users, without having any function of lighting up the road for the benefit of the driver of the vehicle, such as direction indicators or daytime running lamps (DRLs). Low beam allows the driver of an automotive vehicle to be seen by other road users and allows its driver to see the roadway properly out to a distance of 30 meters, without dazzling other users on the road. High beam allows the driver to see the roadway properly out to a distance of 100 meters, but can dazzle other road users, and should only be used outside built-up areas and when there are no users in front of the motor vehicle.

To make the lighting means of an automotive vehicle compact, it is sought to group together within a single headlamp the various means allowing these signalling functions and these lighting functions to be performed, and automotive vehicle manufacturers or equipment manufacturers may in particular seek to have a common optical element for each of these functions, for example in the form of a transparent or translucent screen which closes off the housing of the headlamp and from which the light rays forming one or other of the lighting or signalling beams emerge.

SUMMARY OF THE INVENTION

In this context of a common optical element, it is also sought to have an extent of the lighting surface equal from one function to the other, notably for the sake of esthetics and visual identity of the lighting means. However, this is difficult to achieve owing to the different characteristics of the lighting and/or signalling functions, a lighting beam having to be directional whereas a signalling beam is diffuse. The presence of diffusing means for generating this signalling beam may interfere with the propagation of the rays intended for the formation of a regulatory lighting beam.

The present invention falls within this context, proposing a luminous and signalling device comprising at least one luminous module adapted to generate a lighting beam along a longitudinal optical axis and an optical element through which the lighting beam is projected, remarkable in that the luminous and signalling device comprises a controllable liquid crystal screen pressed against the optical element, the controllable liquid crystal screen being adapted to take on different diffusion states including at least a lighting beam projection state in which the controllable liquid crystal screen is transparent and a signalling beam emission state in which the controllable liquid crystal screen is at least partially diffusing.

Such a luminous and signalling device may be installed on a vehicle to be used as signalling lights, low beam lights and/or high beam lights for example, and thus allow the generation of lighting or signalling beams on the same display surface, without the presence of the signalling lights disrupting the regulatory operation of the high beam lights or low beam lights for lighting up the road for the vehicle equipped with this luminous and signalling device.

In the luminous and signalling device according to the invention, the luminous module is configured to generate a lighting beam projected toward the optical element. Note that when the luminous and signalling device is installed on an automotive vehicle, it is the lighting beam which is used to produce the beam of the low beam lights and/or the beam of the high beam lights.

In addition, the luminous and signalling device comprises a housing in which the luminous module is installed, the optical element possibly forming, for example, an element for closing off said housing. In other words, the optical element contributes to forming one of the walls of the housing in which the luminous module is housed, the latter projecting the lighting beam onto the road through the optical element.

The controllable liquid crystal screen is affixed to this optical element to form an optical unit which can strongly diffuse the passage of the lighting beam or which can, on the contrary, weakly diffuse the passage of the lighting beam through the optical element.

Furthermore, "transparent" means that the controllable liquid crystal screen is capable of allowing light beams to pass through it without causing any significant disruption to said light beams, for example other than Fresnel reflections when passing through the controllable liquid crystal screen.

Moreover, the states of the controllable liquid crystal screen may be defined according to the haze factor of said controllable liquid crystal screen. For example, in the projection state, the controllable liquid crystal screen has a haze factor of low value, for example less than 6%. Advantageously, the haze factor of the controllable liquid crystal screen is approximately 3% when said screen is in the projection state.

Conversely, in the signalling beam emission state, the controllable liquid crystal screen has a haze factor of high value, for example more than 90%. Advantageously, the haze factor of the controllable liquid crystal screen is approximately 98% when said screen is in the emission state.

According to an optional feature of the invention, the controllable liquid crystal screen is placed between the optical element and the luminous module. The controllable liquid crystal screen is advantageously placed between the luminous module and the optical element such that, when the optical unit is transparent as a whole, the lighting beam generated by the luminous module is caused to pass successively through the controllable liquid crystal screen and through the optical element.

The invention may include one or more features as described below, which features may be implemented alone or in combination with other features.

According to an optional feature of the invention, the controllable liquid crystal screen is attached to the optical element by adhesive bonding.

According to an optional feature of the invention, the controllable liquid crystal screen is attached to the optical element by means of an optical adhesive. The term "optical adhesive" means a transparent adhesive having an optical index close to at least one of the elements adhesively bonded, in this case the controllable liquid crystal screen and/or the optical element.

According to an optional feature of the invention, the controllable liquid crystal screen is attached to the optical element by overmolding.

According to an optional feature of the invention, the controllable liquid crystal screen comprises two transparent walls, a polymer matrix extending between the two transparent walls and in which liquid crystals are dispersed, and two electrodes associated respectively with one of the transparent walls so as to pass an electric current through the polymer matrix and its liquid crystals.

According to an optional feature of the invention, at least one wall comprises a current-conducting layer directly in contact with the polymer matrix and an electrically insulating layer arranged to cover the conducting layer on the opposite side to the polymer matrix. The conducting layer may be formed of indium tin oxide (ITO) and the insulating layer may be formed of polycarbonate (PC) or polyethylene terephthalate (PET).

According to an optional feature of the invention, the controllable liquid crystal screen comprises an internal transparent wall facing the luminous module and an external transparent wall facing the external environment of the luminous and signalling device, the optical element constituting the external transparent wall.

According to an optional feature of the invention, the luminous and signalling device comprises a control member for controlling the controllable liquid crystal screen, configured to electrically power the controllable liquid crystal screen such that the controllable liquid crystal screen goes from a projection state to a signalling beam emission state and vice versa as a function of a change in the electrical power supply. When electrical power is supplied to the controllable liquid crystal screen, and more particularly when electrical power is supplied to the polymer matrix via the electrodes, the liquid crystals embedded in the polymer matrix are all oriented parallel to the direction of the electric current passing through the polymer matrix, that is to say perpendicular to the transparent walls of the screen. In such a configuration, the light beam is able to pass through the controllable liquid crystal screen without being deflected by the liquid crystals, which are arranged in the main direction of propagation of the light beam, in such a way as to form a regulatory lighting beam.

According to another example of the invention, the liquid crystals are naturally oriented in such a way as to allow the light beam to pass through the controllable liquid crystal screen without electrical power. In this example of the invention, when electrical power is supplied to the controllable liquid crystal screen, and more particularly when electrical power is supplied to the polymer matrix via the electrodes, the liquid crystals embedded in the polymer matrix are all oriented randomly, in such a way as to make the light beam diffuse when it passes through the controllable liquid crystal screen.

According to an optional feature of the invention, the control member is electrically connected to each of the electrodes of the controllable liquid crystal screen.

According to an optional feature of the invention, the luminous and signalling device comprises a main light source constituting the luminous module and an additional light source installed facing the optical element.

According to an optional feature of the invention, the main light source is configured to contribute to generating a light beam intended to pass through an optical unit formed by the controllable liquid crystal screen and the optical element, this light beam being capable of forming a lighting beam or a signalling beam depending on the diffusion state of the controllable liquid crystal screen.

According to an optional feature of the invention, the additional light source is configured to contribute to generating a signalling beam.

According to an optional feature of the invention, the main light source and the additional light source are supplied with power simultaneously or separately.

According to an optional feature of the invention, the optical element has an inner face in contact with the controllable liquid crystal screen, an opposite outer face and a peripheral edge connecting the inner face to the outer face, the additional light source being installed facing the peripheral edge of the optical element.

According to an optional feature of the invention, the controllable liquid crystal screen comprises a first portion and a second portion extending around the periphery of the first portion, the diffusion state of one of the portions of the controllable liquid crystal screen being independent of the diffusion state of the other of said portions.

According to an optional feature of the invention, the first portion is electrically powered by the control member independently of the second portion.

According to an optional feature of the invention, the luminous and signalling device comprises a light ray diffusion element arranged facing the second portion of the controllable liquid crystal screen.

According to an optional feature of the invention, the diffusion element comprises a film installed between the controllable liquid crystal screen and the optical element.

According to an optional feature of the invention, the optical element comprises a main zone facing the first portion of the controllable liquid crystal screen and a zone peripheral to the main zone facing the second portion of the controllable liquid crystal screen, the diffusion element constituting the peripheral zone of the optical element.

According to an optional feature of the invention, the luminous and signalling device comprises a masking member arranged to cover the periphery of the outer face of the optical element.

The invention also relates to an automotive vehicle equipped with at least one luminous and signalling device as described above.

BRIEF DESCRIPTION OF DRAWINGS

Further features, details and advantages of the invention will become more clearly apparent from reading the following description on the one hand, and on the other hand from a plurality of embodiments provided by way of non-limiting indication with reference to the appended schematic drawings, in which:

FIG. 1 schematically depicts a first embodiment of a luminous and signalling device according to the invention, with an optical unit formed of an optical element and a controllable liquid crystal screen, in a first configuration in which at least a portion of the controllable liquid crystal screen is in a projection state, in other words a state referred to as transparent;

FIG. 2 schematically depicts the first embodiment of the luminous and signalling device shown in FIG. 1, in a second configuration in which the controllable liquid crystal screen is in a signalling beam emission state, in other words a state referred to as diffusing;

FIG. 4 schematically depicts a second embodiment of a luminous and signalling device according to the invention.

DETAILED DESCRIPTION OF THE INVENTION

Figure 3:
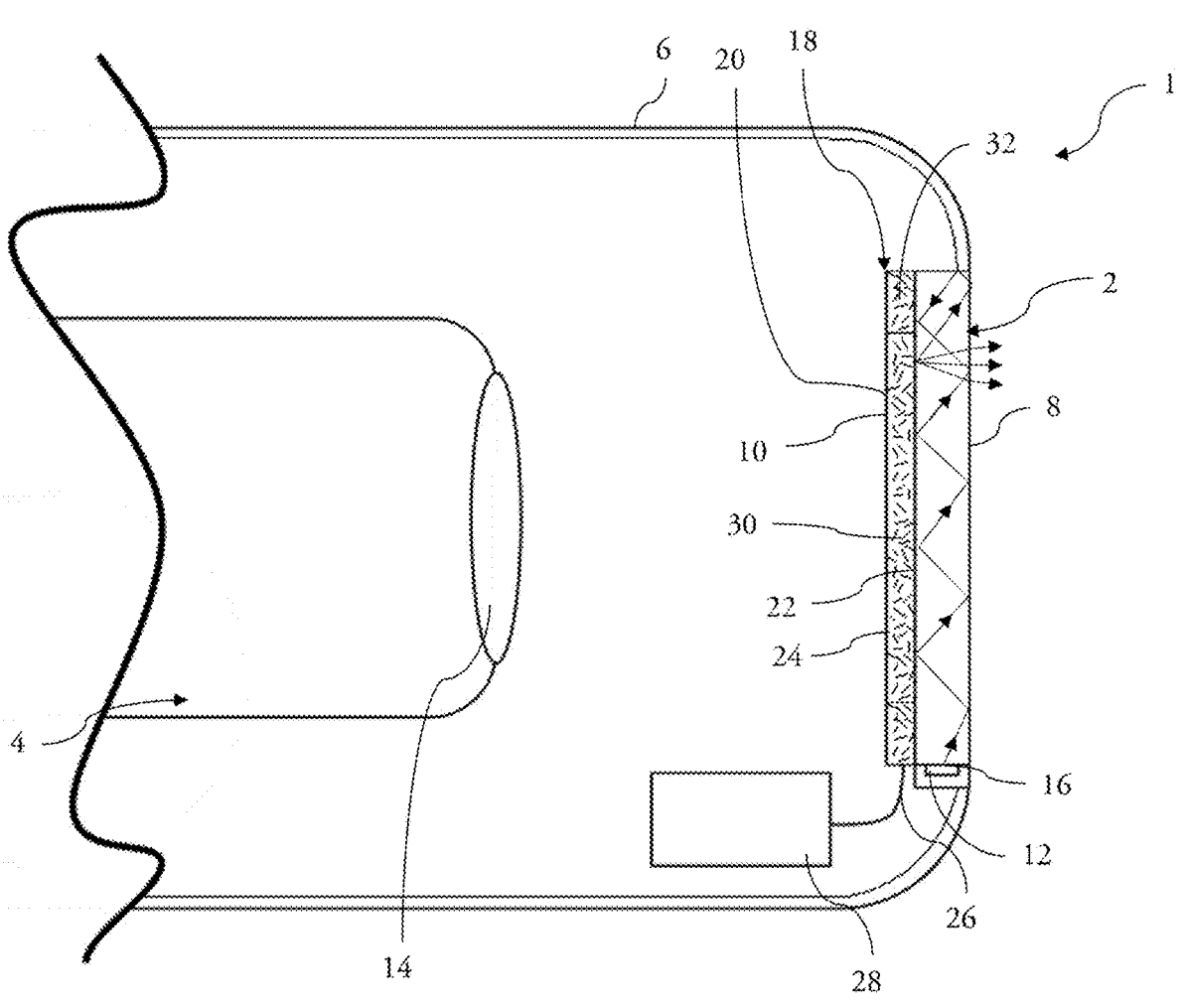
FIG. 3 schematically depicts the first embodiment of the luminous and signalling device shown in FIG. 1, in a third configuration in which the controllable liquid crystal screen is in a signalling beam emission state, in other words a state referred to as diffusing.

The features, variants and different embodiments of the invention may be associated with one another according to various combinations, provided that they are not incompatible or mutually exclusive. In particular, it will be possible to conceive of variants of the invention which comprise only a selection of the features described hereinafter in isolation from the other features described, if this selection of features is sufficient to confer a technical advantage and/or to differentiate the invention from the prior art.

In the figures, elements that are common to multiple figures retain the same reference sign.

Figure 1:
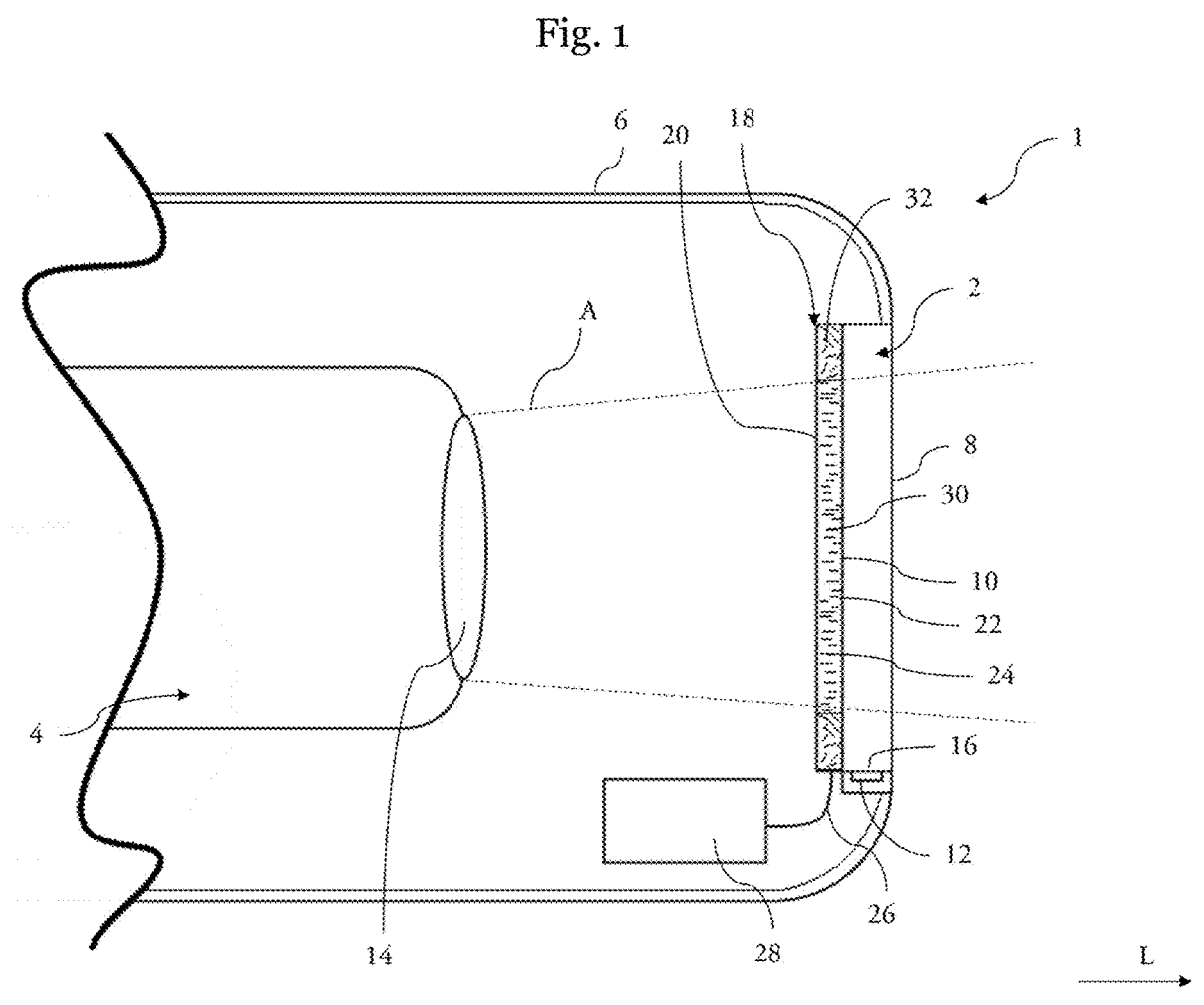

FIG. 1 shows a luminous and signalling device 1 according to the invention fitted in an automotive vehicle and notably configured to generate a lighting beam or a signalling beam A mainly along a longitudinal optical axis L.

The luminous and signalling device 1 comprises an optical element 2 through which a light beam A is projected to form the lighting beam adapted to light up the road. The optical element 2 thus forms a luminous surface of the luminous and signalling device, the shape and dimensions of which affect the visual identity of the function.

The luminous and signalling device 1 comprises a luminous module 4 which is configured to generate the light beam A and direct it toward the optical element 2 and it is understood that this luminous module 4 may project a light beam adapted to form a low beam type lighting function and/or a high beam type lighting function.

According to the invention, and as can be seen in FIG. 1 to FIG. 5, the luminous and signalling device 1 comprises a controllable liquid crystal screen 18 pressed against the optical element 2 to form an optical unit arranged in the direction from which the light beam A is directed when the luminous module 4 is active. The controllable liquid crystal screen 18 is arranged between the optical element 2 and the luminous module 4, such that it is the optical element which is turned toward the outside of the luminous and signalling device and forms the luminous surface of this device.

As will be described in more detail below, controlling the controllable liquid crystal screen 18 makes it possible to modify its diffusion state and the general diffusion state of the optical unit and therefore to modify the impact that the optical unit may have on the projection of the light beam toward the road. In other words, the luminous module is intended to project a light beam which passes through the optical unit, being deflected only a little or not at all by this optical unit if the controllable liquid crystal screen 18 is transparent, or being deflected and therefore made diffuse if the controllable liquid crystal screen 18 is diffusing.

As shown in FIG. 1, the luminous and signalling device 1 comprises a housing 6 to which is attached the optical element 2, and more particularly the optical unit formed of the optical element and the controllable liquid crystal screen 18, and in which the luminous module 4 is housed. The optical element 2 forms at least a part of one of the walls of the housing 6, having an outer face 8 oriented toward the outside of the luminous and signalling device 1, and an inner face 10 which contributes to delimiting at least partially a housing for the luminous module 4. The optical element 2 is, for example, a transparent screen through which the light beam A is adapted to be projected. The optical element 2 is optically neutral, that is to say that it does not deflect light rays, without this constituting a limitation on the invention.

As can be seen in FIG. 1 to FIG. 5, the luminous and signalling device 1 comprises a main light source constituting the luminous module 4 and an additional light source 12 installed facing the optical element 2. The main light source is in this case configured to contribute to forming the light beam A while the additional light source 12 is configured to contribute to forming a signalling beam.

The main light source, not visible in the figures because it is housed in a casing of the luminous module, is for example formed by one or more light-emitting diodes, commonly called LEDs, and configured to generate light rays.

The luminous module 4 may comprise, in addition to the main light source, an optical member, the main light source being configured to emit light rays toward the optical member.

The optical member is configured to group together the light rays emitted by the main light source into a light beam A in the direction at least of the optical element 2.

The optical member may consist of a projection lens.

The optical member may further comprise a reflector, or reflective element, arranged facing the main light source, the reflector having the function of directing the light rays emitted by the main light source toward the projection lens.

The optical member may, alternatively, comprise a reflector having the function of directing the light rays emitted by the main light source toward the optical element 2.

In general, the optical member may comprise one or more reflectors, one or more lenses, as well as any combination of one or more reflectors and one or more lenses.

The additional light source 12 is arranged facing a transverse edge 16 of the optical element 2. The transverse edge 16 of the optical element 2 is a face of the optical element 2 connecting, at the periphery, the inner face 10 and the outer face 8 of the optical element 2. In other words, the additional light source 12 projects light rays within the optical element 2 from an edge face of the latter, the light rays propagating by successive total reflections within the optical element 2, in a direction originally substantially perpendicular to the longitudinal direction mentioned above and as shown by way of example in FIG. 2. The propagation by successive total reflections of a light ray generated by the additional light source 12 continues in the optical element 2 until it encounters a diffusing element which deflects the path of this ray toward the outer face 8 at an appropriate angle to be refracted toward the road and contribute to generating a signalling beam for other road users.

The main light source and the additional light source 12 may be supplied with power simultaneously or separately and the supply of power to each of the sources depends on the diffusion state of the controllable liquid crystal screen 18.

The controllable liquid crystal screen 18 may be attached to the optical element 2 by adhesive bonding, using adhesive that may be applied between the controllable liquid crystal screen 18 and the optical element 2, for example on the periphery of the contact face between the controllable liquid crystal screen 18 and the optical element 2, or alternatively may be attached to the optical element 2 by overmolding. This alternative makes it possible to rigidly secure the controllable liquid crystal screen 18 to the optical element 2 without inserting adhesive between the controllable liquid crystal screen 18 and the optical element 2 which could have a minimal effect on the propagation of the light rays emitted by the luminous module through the optical unit formed by the controllable liquid crystal screen 18 and the optical element 2.

The controllable liquid crystal screen 18 makes it possible to adjust the diffusion level of the optical unit that it helps to form with the optical element 2 so as to make the light beam A caused to pass through this optical unit diffuse or not diffuse, or so as to form a diffusing screen facing an inner face of the optical element 2 and promote the exit toward the road, in a signalling beam, of light rays emitted on the edge face of the light guide formed by this optical element.

To this end, the controllable liquid crystal screen 18 is arranged between the luminous module 4 and the optical element 2 such that it contributes to forming a diffusing face of the optical element on the opposite side to the road when the controllable liquid crystal screen 18 is configured accordingly. Note that with this arrangement, the light beam A is caused to pass through the controllable liquid crystal screen 18 before passing through the optical element 2 when the controllable liquid crystal screen is configured to be transparent to the passage of the light rays.

According to the invention, the controllable liquid crystal screen 18 is adapted to take on different diffusion states including at least a projection state allowing the projection of the light beam A through the optical unit to form a lighting beam exiting the optical unit and in which the controllable liquid crystal screen 18 is transparent, and a signalling beam emission state in which the controllable liquid crystal screen 18 is not transparent.

The projection state of the controllable liquid crystal screen 18 is associated with the emission of the light beam A by the luminous module and the use of this light beam A to generate a lighting function of low beam or high beam type, while the emission state of the controllable liquid crystal screen 18 is either associated with the emission of the light beam A and its transformation by diffusion or associated with the emission of light rays directly in the light guide formed by the optical element via the use of the additional light source.

These different states of the controllable liquid crystal screen 18 are defined according to the haze factor that said controllable liquid crystal screen 18 has in each of these states, the haze factor corresponding to the percentage of light rays that manage to pass through an object that they encounter.

For example, in the lighting beam projection state, the controllable liquid crystal screen 18 has a haze factor of low value, for example less than 6%. Advantageously, the haze factor of the controllable liquid crystal 18 screen is approximately 3% when said screen 18 is in the projection state.

Conversely, in the signalling beam emission state, the controllable liquid crystal screen is in a non-diffusion state, in other words it has a haze factor of high value, for example more than 90%. Advantageously, the haze factor of the controllable liquid crystal screen 18 is approximately 98% when said screen is in the emission state.

The haze factor of the controllable liquid crystal screen 18 is modified by modifying the electrical power supply to this screen, which has the effect of modifying the orientation of the liquid crystals within the screen and making it possible to generate greater or lesser deflection of the light rays passing through the screen by these liquid crystals.

More particularly, the controllable liquid crystal screen 18 comprises two transparent walls 20, 22 and a polymer matrix 24 in which liquid crystals are dispersed randomly and which extends between the two transparent walls 20, 22. The controllable liquid crystal screen also comprises electrodes connected respectively to each of the transparent walls 20, 22 to allow the passage of electric current within the controllable liquid crystal screen, and more specifically to allow the passage of current from one transparent wall to the other through the polymer matrix. Each of the walls may notably comprise two layers stacked one on top of the other, with a current-conducting layer, for example formed of indium tin oxide (ITO), directly in contact with the polymer matrix, and an electrically insulating layer, for example formed of polycarbonate (PC), arranged to cover the conducting layer on the opposite side to the polymer matrix.

The controllable liquid crystal screen 18 comprises more particularly an internal transparent wall 20 facing the luminous module 4 and an external transparent wall 22 facing the external environment of the luminous and signalling device 1, the optical element 2 being against the external transparent wall 22. Where appropriate, if the manufacturing means so allow, the optical element 2 may form the external transparent wall 22 and more particularly the electrically insulating layer of this external transparent wall.

The luminous and signalling device 1 comprises a control member 28 for controlling the controllable liquid crystal screen 18, intended to control the electrical power supply to the controllable liquid crystal screen 18 via the electrodes and a power supply cable 26 shown schematically in the figures. The control member 28 is configured to electrically power the controllable liquid crystal screen 18, and more particularly the polymer matrix 24 and the liquid crystals which are embedded therein and originally dispersed randomly, in such a way as to orient the liquid crystals in a direction parallel to the main direction of the current within the polymer matrix when the screen is supplied with power, and thus limit the impact of the liquid crystals on the path of the light rays. It will be appreciated that when electrical power is supplied to the controllable liquid crystal screen 18, this results in an arrangement of the liquid crystals that causes the screen to go from a diffusing state to a transparent state, in other words in this case from a signalling beam emission state to a lighting beam projection state.

Where applicable, intermediate states may be conferred on the controllable liquid crystal screen 18 by adjusting the intensity of the electric current passed through the polymer matrix.

More particularly, the initial state of the controllable liquid crystal screen 18 is the diffusing state, which corresponds to the state of the controllable liquid crystal screen 18 when the polymer matrix 24 and the liquid crystals embedded therein are not supplied with electrical power and the arrangement of the liquid crystals is random, such that the light rays encountering and/or passing through the screen and the optical unit that it helps to form are reflected and refracted and emerge in the diffuse state.

As soon as the control member 28 supplies electrical power to the polymer matrix 24, in particular via the electrodes and the cable 26, the liquid crystals become organized, in particular aligning themselves perpendicularly with respect to the transparent walls bearing the electrodes, such that the controllable liquid crystal screen goes into a projection state, the light beam A then being able to pass through the controllable liquid crystal screen 18 in the direction of the optical element 2 so that it can form a regulatory lighting beam on the road.

Figure 2:
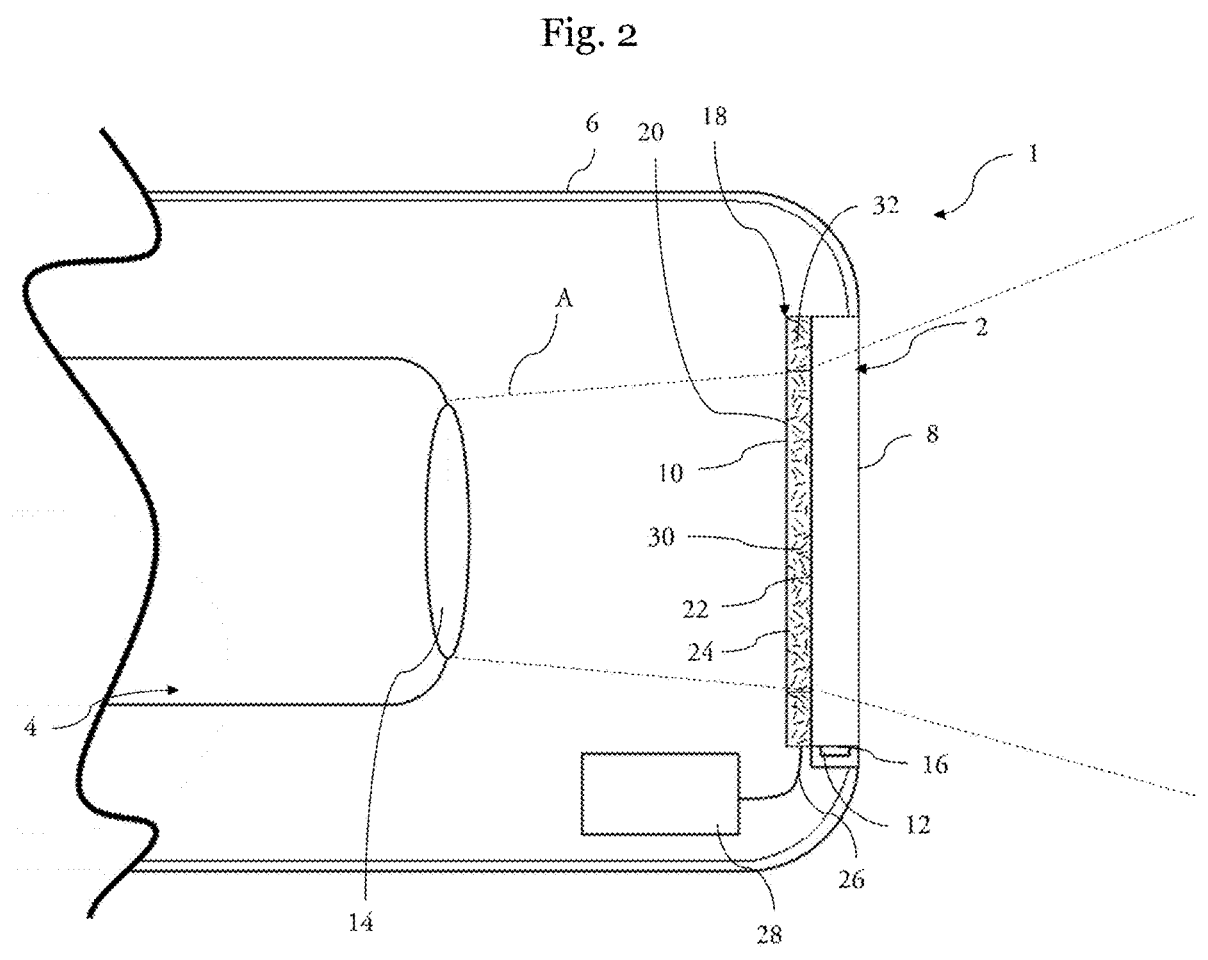

These two different diffusion states can notably be seen in FIG. 1 to FIG. 3, in which a controllable liquid crystal screen 18 is shown partially transparent and partially non-transparent in FIG. 1, and entirely in a non-transparent state in FIG. 2 and FIG. 3.

Several embodiments of the invention will now be described, including a first embodiment illustrated in FIG. 1 to FIG. 3, a second embodiment illustrated in FIG. 4, and a third embodiment illustrated in FIG. 5. Each of the embodiments described may be implemented alternatively or in addition to one or more other embodiments, unless stated otherwise. In addition, items common to the various embodiments and to what has been described above will have the same references in each of the descriptions of the embodiments below.

According to a first embodiment of the invention, and as shown more particularly in FIG. 1 to FIG. 3, the controllable liquid crystal screen 18 comprises a first portion 30 and a second portion 32 extending around the periphery of the first portion 30, the diffusion state of one of the portions being independent of the diffusion state of the other portion. In other words, the first portion 30 is electrically powered by the control member 28 independently of the second portion 32 such that, depending on the use, an electrical power supply of the same intensity may be sent to the two portions simultaneously or one of the two portions, in particular the second portion 32, may not be supplied with power whereas the first portion is.

The second portion 32 may in particular be made electrically independent of the first portion 30 by laser cutting of the surface of the transparent walls, which allows a separate electrical power supply for each of the two portions.

The second portion 32 is formed on the periphery of the screen over a dimension such that the light beam A emitted by the luminous module 4 is projected onto the controllable liquid crystal screen 18 essentially or entirely onto the first portion 30.

For example, in a first configuration shown in FIG. 1, the first portion 30 of the controllable liquid crystal screen 18 is electrically powered so as to orient the liquid crystals in the direction of the current flowing within the polymer matrix, such that this first portion 30 is in a lighting beam projection state, i.e. with high transparency. Also in this first configuration, the second portion 32 of the controllable liquid crystal screen is not electrically powered such that the liquid crystals remain dispersed randomly within the polymer matrix of this second portion 32 and this second portion is in a light beam emission state, i.e. a diffusing state, with low transparency.

In this first configuration, the light beam A emitted by the luminous module is projected through the first portion 30 of the controllable liquid crystal screen 18, and it will be appreciated that the first portion 30 of the controllable liquid crystal screen 18 and the optical element 2 form an assembly which does not deflect the light beam A, such that the lighting function of the luminous module, whether it is a low beam or high beam function, is not affected by the presence of the controllable liquid crystal screen 18 and can meet regulatory standards.

Provision may also be made for the emission of light rays by the additional light source, to give the luminous and signalling device a more uniform appearance.

According to a second configuration shown in FIG. 2, the first portion and the second portion of the controllable liquid crystal screen 18 are each in a diffusing state, in other words a signalling beam emission state. Neither the first portion 30 nor the second portion 32 of the controllable liquid crystal screen 18 are electrically powered by the control member 28 such that the liquid crystals present in each of these portions remain in their original position, i.e. dispersed randomly in the polymer matrix, with different orientations to each other. In this second configuration, the luminous module 4 is inactive such that no light beam attempts to pass through the optical unit formed by the controllable liquid crystal screen 18 and the optical element 2. No lighting function is performed by the luminous and signalling device 1 of the invention.

Conversely, the additional light source 12 arranged facing an edge face of the optical element 2 is activated in such a way as to emit light rays in the thickness of the optical element. As mentioned above and as can be seen in FIG. 2, the light rays encounter a diffusing element, formed by the diffusing state of the controllable liquid crystal screen 18 pressed against the inner face 10 of the optical element 2, and they are then deflected so as to be directed facing/opposite the outer face 8 at an angle allowing them to be diffracted out of the optical element, to form a signalling beam.

The diffusing state of the controllable liquid crystal screen 18 contributes to generating a signalling beam, via the activation of the additional light source, such that this diffusing state corresponds, as mentioned, to a signalling beam emission state.

It is also possible to provide for the luminous module to project a light beam in order to make the diffusion of the light rays even more homogeneous.

According to a third configuration shown in FIG. 3, the first portion 30 and the second portion 32 of the controllable liquid crystal screen 18 are also in a diffusing state. This third configuration differs in particular from the second configuration in that the luminous module is active, such that a light beam A is passed through the first portion 30, now diffusing unlike the first configuration of FIG. 1, of the controllable liquid crystal screen 18. The light beam A is thus deflected and made diffuse by the random arrangement of the liquid crystals to form a signalling beam exiting the luminous and signalling device of the invention.

According to an alternative configuration that has not been shown, the diffusion of a light beam A emitted by the luminous module and the diffusion of light rays emitted by the additional light source may be combined to increase the intensity of a signalling beam generated by the luminous and signalling device.

Furthermore, in any of the configurations, the haze factor of the controllable liquid crystal screen 18 may take on intermediate values, in particular by varying the intensity of the electrical power supply from one configuration to another. The intensity of the electrical power supply may also vary according to the concentration of liquid crystals dispersed in the polymer matrix.

Alternatively, provision could also be made for only the second portion 32 to be powered, while the first portion 30 is not. It will be appreciated that, in such a case, the first portion 30 is in an emission state while the second portion 32 is in a projection state.

Provision may also be made for the first portion 30 and the second portion 32 to be each supplied with electrical power, each of the portions then being in a projection state.

Figure 4:
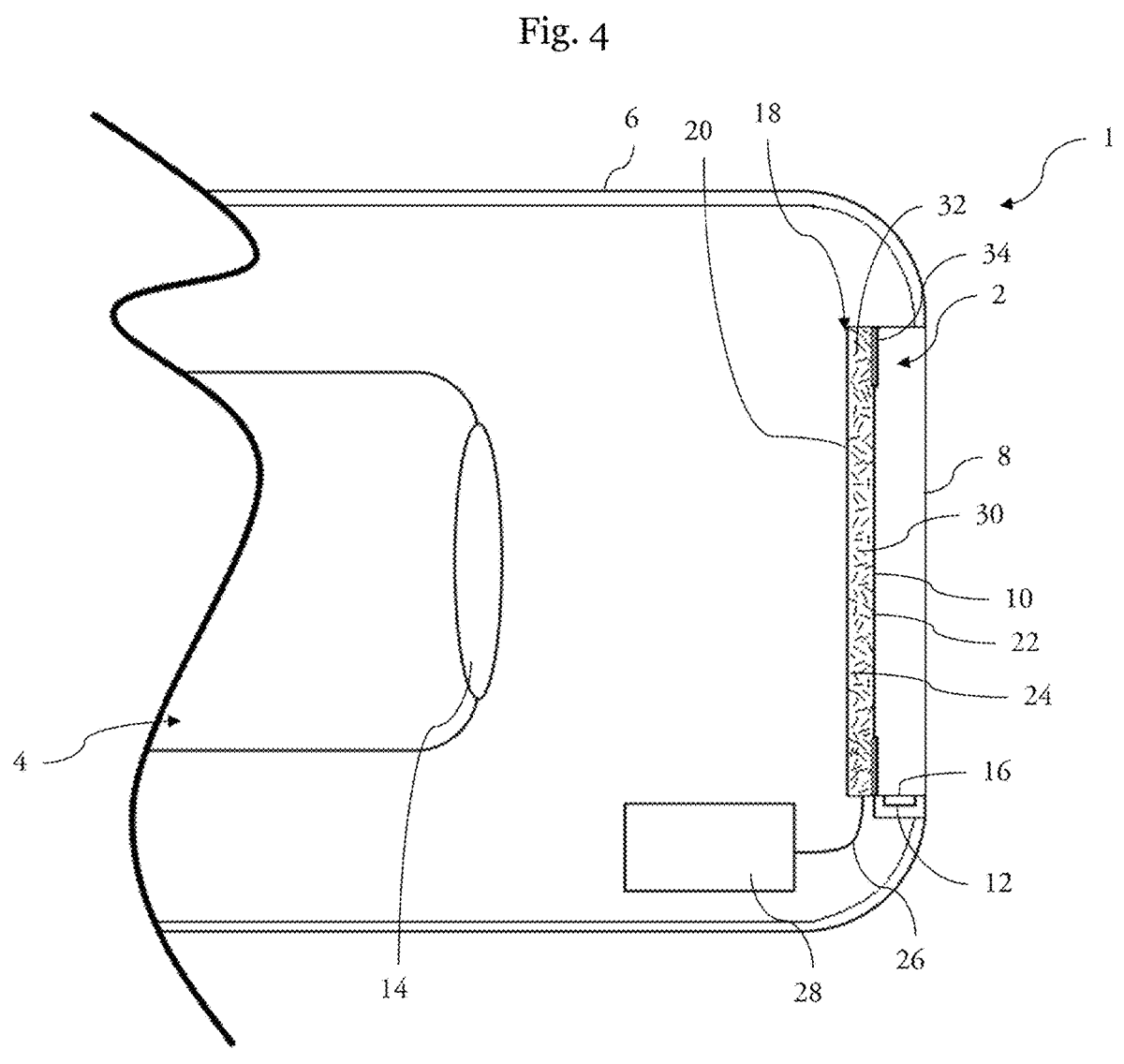

According to a second embodiment of the invention, and as can be seen in FIG. 4, the luminous and signalling device 1 comprises a light ray diffusion element 34 arranged facing the second portion 32 of the controllable liquid crystal screen 18. For example, the diffusion element 34 is a film installed between the controllable liquid crystal screen 18 and the optical element 2, the film of the light ray diffusion element 34 extending at the periphery of the optical element such that the light rays propagating by successive reflections within the optical element and encountering this diffusing film are caused to be deflected and subsequently encounter the outer face 8, or exit face, of the optical element at an angle such that they can be refracted to exit the optical element and form a signalling beam, in the direction of the external environment of the luminous and signalling device 1.

The optical element 2 may thus be defined as comprising a main zone facing the first portion 30 of the controllable liquid crystal screen 18 and a zone peripheral to the main zone facing the second portion 32, the diffusion element 34 constituting the peripheral zone of the optical element 2. It will be appreciated that the diffusion element 34 is an integral part of the optical element 2 and may form, for example, a graining pattern on the periphery of the optical element 2 in order to diffuse the light rays passing through the optical element 2 at its periphery.

Note that the presence of a diffusion element 34 on the periphery of the optical element 2 is not incompatible with the various configurations mentioned above with reference to the first embodiment.

Figure 5:
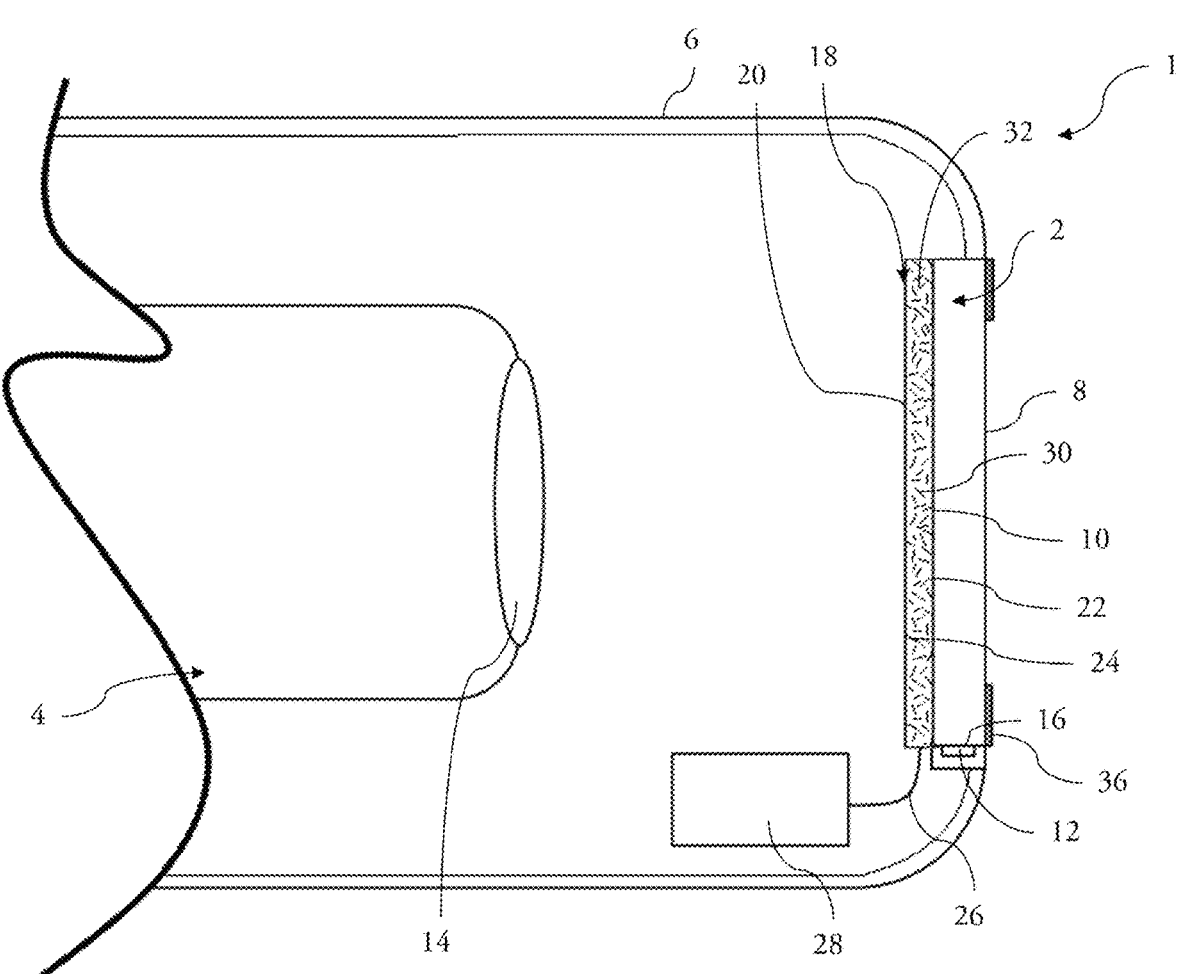
FIG. 5 schematically depicts a third embodiment of a luminous and signalling device according to the invention.

According to a third embodiment, and as shown in FIG. 5, the luminous and signalling device 1 comprises a masking member 36 arranged to cover the periphery of the outer face 8 of the optical element 2. For example, masking member 36 means a wall extending from the housing 6 facing the outer face 8 of the optical element 2 and covering at least the periphery of the optical element 2. The wall may thus have a particular profile, cutting the contours of the signalling beams emitted by the luminous and signalling device 1 according to the invention, and thus ensuring a recognizable visual identity for the vehicle.

Again in this case, note that the presence of a masking member 36 on the periphery of the optical element 2 is not incompatible with the various configurations mentioned above with reference to the first embodiment.

As a reminder, the invention relates to a luminous and signalling device comprising a luminous module and a controllable liquid crystal screen adapted to take on different diffusion states and arranged across a direction of emission of a light beam emitted by this luminous module, the different diffusion states of the controllable liquid crystal screen being defined by an appropriate electrical power supply as a function of the need to emit a lighting beam which must not be or must be only slightly deflected at the output of the luminous module or the need to emit a signalling beam. The invention is thus particularly advantageous in that it makes it possible to use the same lighting surface for each of the luminous and signalling functions performed by the luminous and signalling device, without interfering with the regulatory projection of a lighting beam.

The present invention is not however limited to the means and configurations described and illustrated herein and it also extends to any equivalent means and configuration and to any technically feasible combination of such means.

What is claimed is:

1. A luminous and signalling device comprising at least one luminous module adapted to generate a lighting beam along a longitudinal optical axis and an optical element through which the lighting beam is projected, the luminous module includes a main light source and an additional light source, the luminous and signalling device includes a controllable liquid crystal screen pressed against the optical element, the controllable liquid crystal screen being adapted to take on different diffusion states including at least a lighting beam projection state in which the controllable liquid crystal screen is transparent and a signalling beam emission state in which the controllable liquid crystal screen is at least partially diffusing, and the optical element includes an inner face in contact with the controllable liquid crystal screen, an opposite outer face and a peripheral edge connecting the inner face to the outer face, the additional light source being installed facing the peripheral edge of the optical element.

2. The luminous and signalling device as claimed in claim 1, wherein the controllable liquid crystal screen includes two transparent walls, a polymer matrix extending between the two transparent walls and in which liquid crystals are dispersed, and two electrodes associated respectively with one of the transparent walls.

3. The luminous and signalling device as claimed in claim 1, further comprising a control member for controlling the controllable liquid crystal screen, configured to electrically power the controllable liquid crystal screen such that the controllable liquid crystal screen goes from a projection state to a signalling beam emission state and vice versa as a function of a change in the electrical power supply.

4. The luminous and signalling device as claimed in claim 1, wherein the controllable liquid crystal screen includes a first portion and a second portion extending around a periphery of the first portion, the diffusion state of one of the portions of the controllable liquid crystal screen being independent of the diffusion state of the other of the portions.

5. The luminous and signalling device as claimed in claim 4, wherein the first portion is electrically powered by a control member independently of the second portion.

6. The luminous and signalling device as claimed in claim 4, further comprising a light ray diffusion element arranged facing the second portion of the controllable liquid crystal screen.

7. The luminous and signalling device as claimed in in claim 4, further comprising a masking member arranged to cover a periphery of the outer face of the optical element.

8. An automotive vehicle equipped with at least one luminous and signalling device, the at least one luminous and signaling device includes at least one luminous module adapted to generate a lighting beam along a longitudinal optical axis and an optical element through which the lighting beam is projected, the luminous module includes a main light source and an additional light source, the luminous and signalling device includes a controllable liquid crystal screen pressed against the optical element, the controllable liquid crystal screen being adapted to take on different diffusion states including at least a lighting beam projection state in which the controllable liquid crystal screen is transparent and a signalling beam emission state in which the controllable liquid crystal screen is at least partially diffusing, and the optical element includes an inner face in contact with the controllable liquid crystal screen, an opposite outer face and a peripheral edge connecting the inner face to the outer face, the additional light source being installed facing the peripheral edge of the optical element.

* * * * *